United States Patent
Denton et al.

(10) Patent No.: US 6,628,426 B2
(45) Date of Patent: Sep. 30, 2003

(54) METHOD OF HALFTONE SCREEN LINEARIZATION VIA CONTINUOUS GRADIENT PATCHES

(75) Inventors: Gary Allen Denton, Lexington, KY (US); Cary Patterson Ravitz, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 85 days.

(21) Appl. No.: 09/862,655

(22) Filed: May 22, 2001

(65) Prior Publication Data

US 2002/0176102 A1 Nov. 28, 2002

(51) Int. Cl.$^7$ .................. H04N 1/405; H04N 1/407; H04N 1/52
(52) U.S. Cl. .................. 358/1.9; 358/504; 358/534; 358/3.06
(58) Field of Search .................. 358/3.06, 3.09, 358/3.1, 3.2, 1.9, 534, 536, 504, 406, 521

(56) References Cited

U.S. PATENT DOCUMENTS

| | | | |
|---|---|---|---|
| 4,427,998 A | 1/1984 | Huntoon | |
| 4,605,970 A | 8/1986 | Hawkins | |
| 4,647,981 A | 3/1987 | Froelich | |
| 4,881,181 A | 11/1989 | Jeschke et al. | |
| 4,999,673 A * | 3/1991 | Bares | 347/131 |
| 5,165,074 A | 11/1992 | Melino | |
| 5,170,267 A | 12/1992 | Blitz et al. | |
| 5,181,068 A | 1/1993 | Morikawa | |
| 5,253,084 A | 10/1993 | Rylander | |
| 5,282,053 A | 1/1994 | Robideau | |
| 5,291,310 A | 3/1994 | Levien | |
| 5,307,181 A | 4/1994 | Levien | |
| 5,347,369 A | 9/1994 | Harrington | |
| 5,353,052 A | 10/1994 | Suzuki et al. | |
| 5,434,604 A | 7/1995 | Cleary et al. | |
| 5,469,267 A | 11/1995 | Wang | |
| 5,508,785 A | 4/1996 | Takahashi et al. | |
| 5,519,441 A | 5/1996 | Gusmano et al. | |
| 5,526,140 A | 6/1996 | Rozzi | |
| 5,543,896 A * | 8/1996 | Mestha | 399/49 |
| 5,572,330 A | 11/1996 | Sasanuma | |
| 5,579,090 A | 11/1996 | Sasanuma et al. | |
| 5,598,272 A | 1/1997 | Fisch et al. | |
| 5,615,001 A | 3/1997 | Kawashima et al. | |
| 5,625,391 A | 4/1997 | Hirabayashi et al. | |
| 5,636,330 A | 6/1997 | Barak | |
| 5,649,073 A | 7/1997 | Knox et al. | |
| 5,684,517 A | 11/1997 | Clemente et al. | |
| 5,758,243 A | 5/1998 | Haneda et al. | |
| 5,831,642 A | 11/1998 | Matsubara et al. | |
| 5,854,882 A | 12/1998 | Wang | |
| 5,856,876 A | 1/1999 | Sasanuma et al. | |
| 5,898,443 A | 4/1999 | Yoshino et al. | |
| 5,926,617 A | 7/1999 | Ohara et al. | |
| 5,930,010 A | 7/1999 | Cheung et al. | |
| 5,946,451 A | 8/1999 | Soker | |
| 6,000,776 A | 12/1999 | Suzuki et al. | |
| 6,003,980 A | 12/1999 | Sheinman et al. | |
| 6,008,907 A | 12/1999 | Vigneau et al. | |
| 6,035,103 A | 3/2000 | Zuber | |
| 6,035,152 A * | 3/2000 | Craig et al. | 399/49 |
| 6,076,915 A | 6/2000 | Gast et al. | |
| 6,084,607 A | 7/2000 | Matsuda | |
| 6,191,867 B1 * | 2/2001 | Shor et al. | 358/1.9 |

* cited by examiner

*Primary Examiner*—Scott Rogers
(74) *Attorney, Agent, or Firm*—Ronald K. Aust; John A. Brady

(57) ABSTRACT

A method of calibrating an electrophotographic machine having an image bearing surface includes depositing a toner patch on the image-bearing surface. The toner patch has a nominal coverage that varies substantially continuously from end to end. Light is emitted onto a selected one of the areas of the toner patch. An amount of light that is reflected off of the selected one area of the toner patch is measured. The emitting and measuring steps are repeated for each of a plurality of different areas of the toner patch. At least one electrophotographic condition is adjusted. The adjusting is dependent upon the measuring steps.

26 Claims, 4 Drawing Sheets

METHOD OF HALFTONE SCREEN LINEARIZATION VIA CONTINUOUS GRADIENT PATCHES

BACKGROUND OF THE INVENTION

1. Field of the Invention

The present invention relates to an electrophotographic machine, and, more particularly, to calibration of halftone screens in an electrophotographic machine.

2. Description of the Related Art

Color laser printers need regular calibration of halftone screens to ensure that printed colors, especially those colors made by mixing multiple color planes, are consistent and accurate. It is known to perform the calibration by measuring a reflection signal from test patches of different shade levels for each color plane. The test patches are sized to either allow multiple measurements on a patch or to sample over a wide area to minimize noise. The number of patches is limited by calibration time and patch size. Thus, the halftone response function is measured at a limited number of points, typically less than twelve. FIG. 1 shows a typical halftone response curve derived by interpolating between ten discrete measurement points.

The limited number of points sampled and the noise inherent in the measurement process limits the accuracy of the linearization process. That is, measuring discrete color patches and fitting a response function to the sample colors compromise halftone screen linearization. This misses important details in the shape of the halftone response curve, especially near zero coverage unless a large number of patches are sampled. An obvious alternative is to increase the number and size of the test patches, but this wastes more toner and increases the amount of time that the printer is unavailable for printing.

What is needed in the art is a method of performing halftone screen linearization that is accurate, quick, and does not use an excessive amount of toner.

SUMMARY OF THE INVENTION

The present invention provides a method of determining the shape of a halftone response curve by using only a single continuous gradient test patch.

The invention comprises, in one form thereof, a method of calibrating an electrophotographic machine having an image-bearing surface. The method includes the steps of depositing a toner patch on the image-bearing surface, the toner patch having a plurality of areas, the plurality of areas having different shade levels; emitting a light beam that extends over a region of multiple areas of the plurality of areas of the toner patch; measuring an amount of light that is reflected off of the multiple areas of the toner patch; repeating the emitting and measuring steps for each of a plurality of different regions of the toner patch; and adjusting at least one electrophotographic condition, the adjusting being dependent upon the measuring steps.

An advantage of the present invention is that a large number of test measurements can be performed on a single continuous gradient patch. Thus, the halftone response curve is determined more accurately than can be determined with discrete test patches.

Another advantage is that a large number of test points can be measured more quickly than by using discrete test patches.

Yet another advantage is a single continuous gradient test patch uses less toner than do multiple discrete test patches.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 5b is a top view of the continuous gradient toner patch of FIG. 4 illuminated by the light source of FIG. 5a;

FIG. 6b is a top view of the continuous gradient toner patch of FIG. 4 illuminated by the light source of FIG. 6a.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
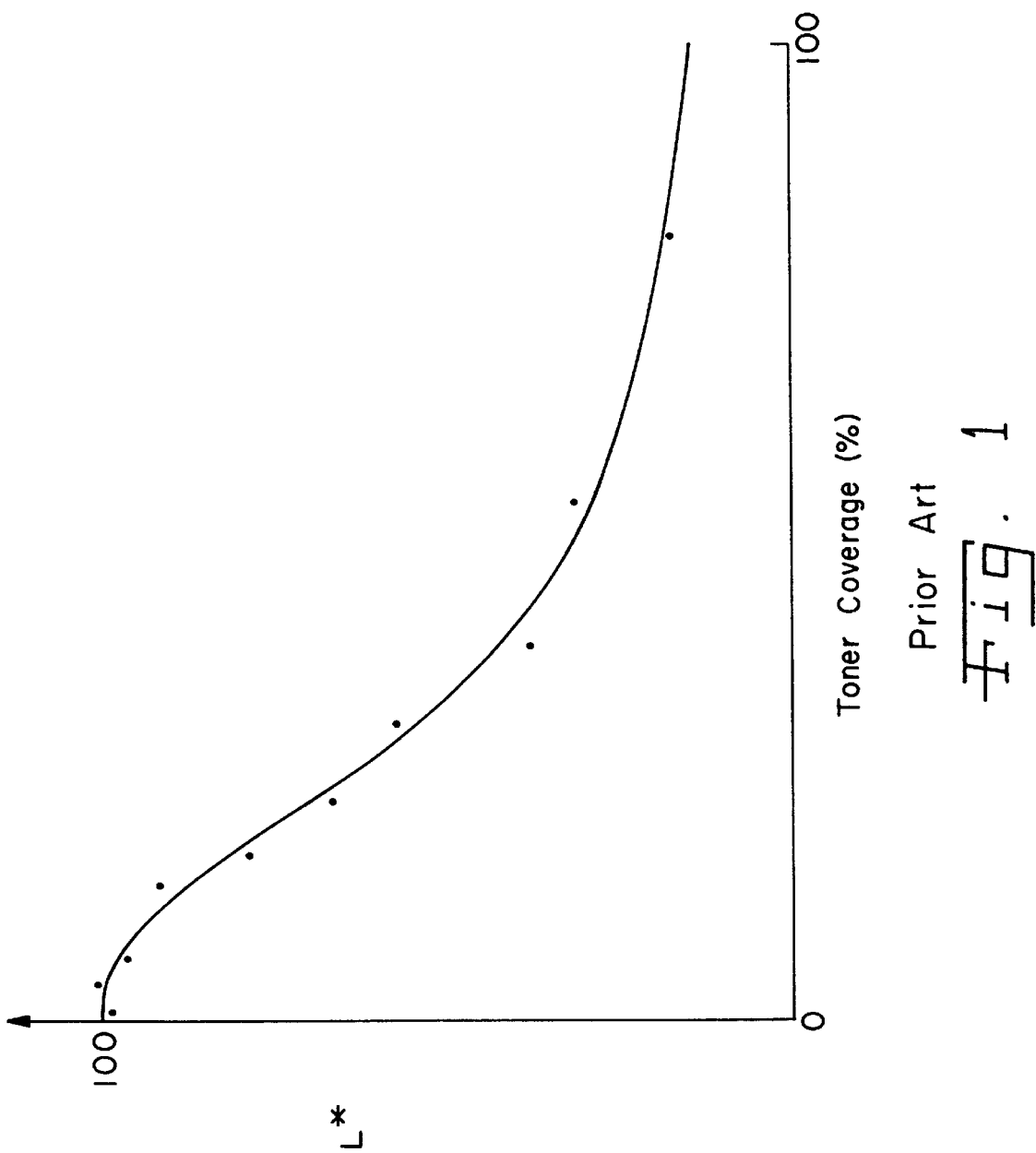
FIG. 1 is a plot of a halftone response curve determined by measuring ten discrete gradient patches.
Figure 2:
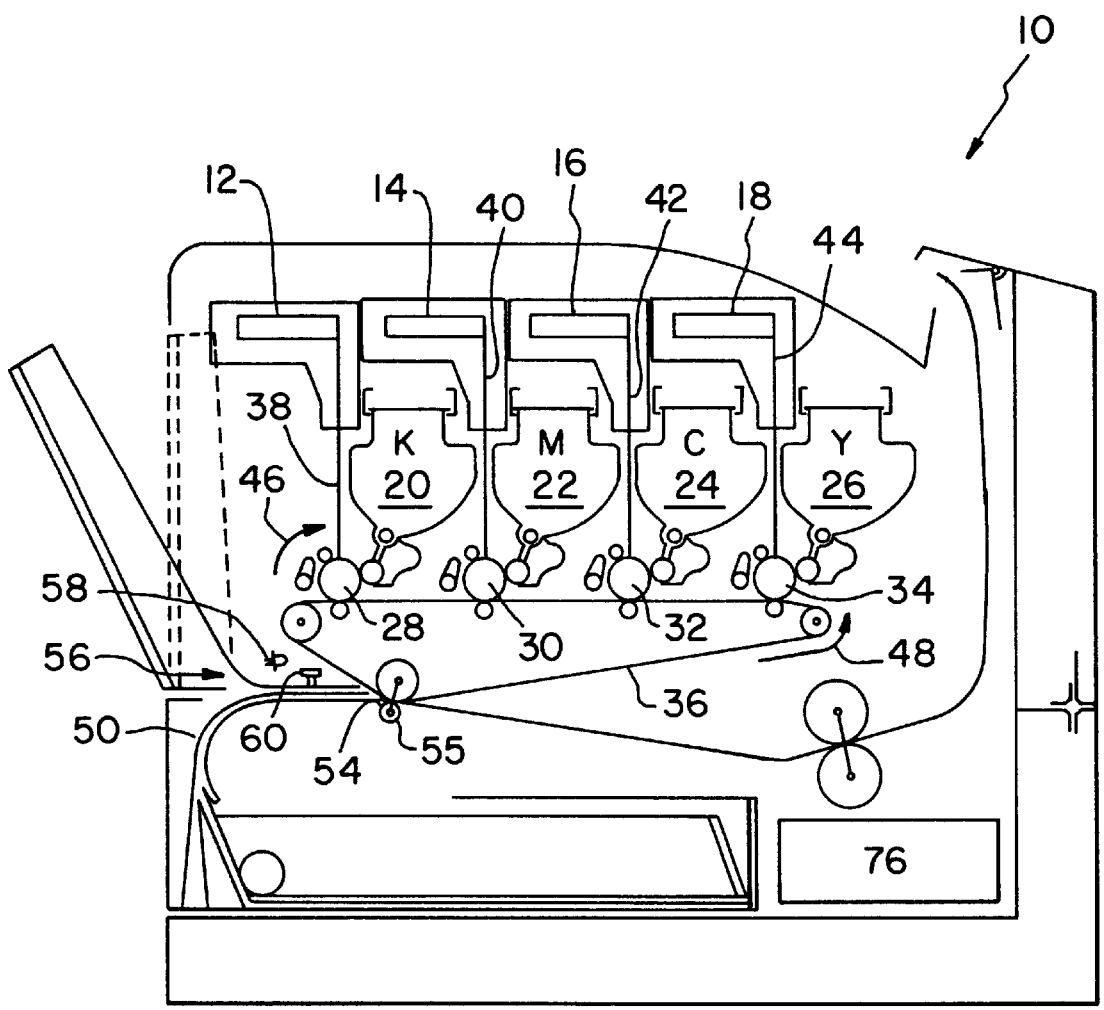
FIG. 2 is a side sectional view of a multicolor laser printer which can be used in conjunction with the method of the present invention.

Referring now to FIG. 2, there is shown one embodiment of a multicolor laser printer 10 including laser printheads 12, 14, 16, 18, a black toner cartridge 20, a magenta toner cartridge 22, a cyan toner cartridge 24, a yellow toner cartridge 26, photoconductive drums 28, 30, 32, 34, and an intermediate transfer member belt 36.

Each of laser printheads 12, 14, 16 and 18 scans a respective laser beam 38, 40, 42, 44 in a scan direction, perpendicular to the plane of FIG. 2, across a respective one of photoconductive drums 28, 30, 32 and 34. Each of photoconductive drums 28, 30, 32 and 34 is negatively charged to approximately −900 volts and is subsequently discharged to a level of approximately −200 volts in the areas of its peripheral surface that are impinged by a respective one of laser beams 38, 40, 42 and 44 to form a latent image thereon made up of a plurality of dots, or pels. The photoconductive drum discharge is limited to about −200 volts because the conductive core is biased at −200 volts to repel toner at the beginning of printing when the photoconductive surface touching the developer roll has not yet been charged to −900 volts by the charge roll. During each scan of a laser beam across a photoconductive drum, each of photoconductive drums 28, 30, 32 and 34 is continuously rotated, clockwise in the embodiment shown, in a process direction indicated by direction arrow 46. The scanning of laser beams 38, 40, 42 and 44 across the peripheral surfaces of the photoconductive drums is cyclically repeated, thereby discharging the areas of the peripheral surfaces on which the laser beams impinge.

The toner in each of toner cartridges 20, 22, 24 and 26 is negatively charged to approximately −600 volts. A thin layer of negatively charged toner is formed on the developer rolls of toner cartridges 20, 22, 24, and 26 by means known to those skilled in the art. The developer roll is biased to approximately −600 volts. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been discharged to −200 volts by the laser beams. As belt 36 rotates in the direction indicated by arrow 48, the toner from each of drums 28, 30, 32 and 34 is transferred to the outside surface of belt 36. As a print medium, such as paper, travels along path 50, the toner is transferred to the surface of the print medium in nip 54. Transfer to paper is accomplished by using a positively biased transfer roll 55 below the paper in nip 54.

Figure 3:
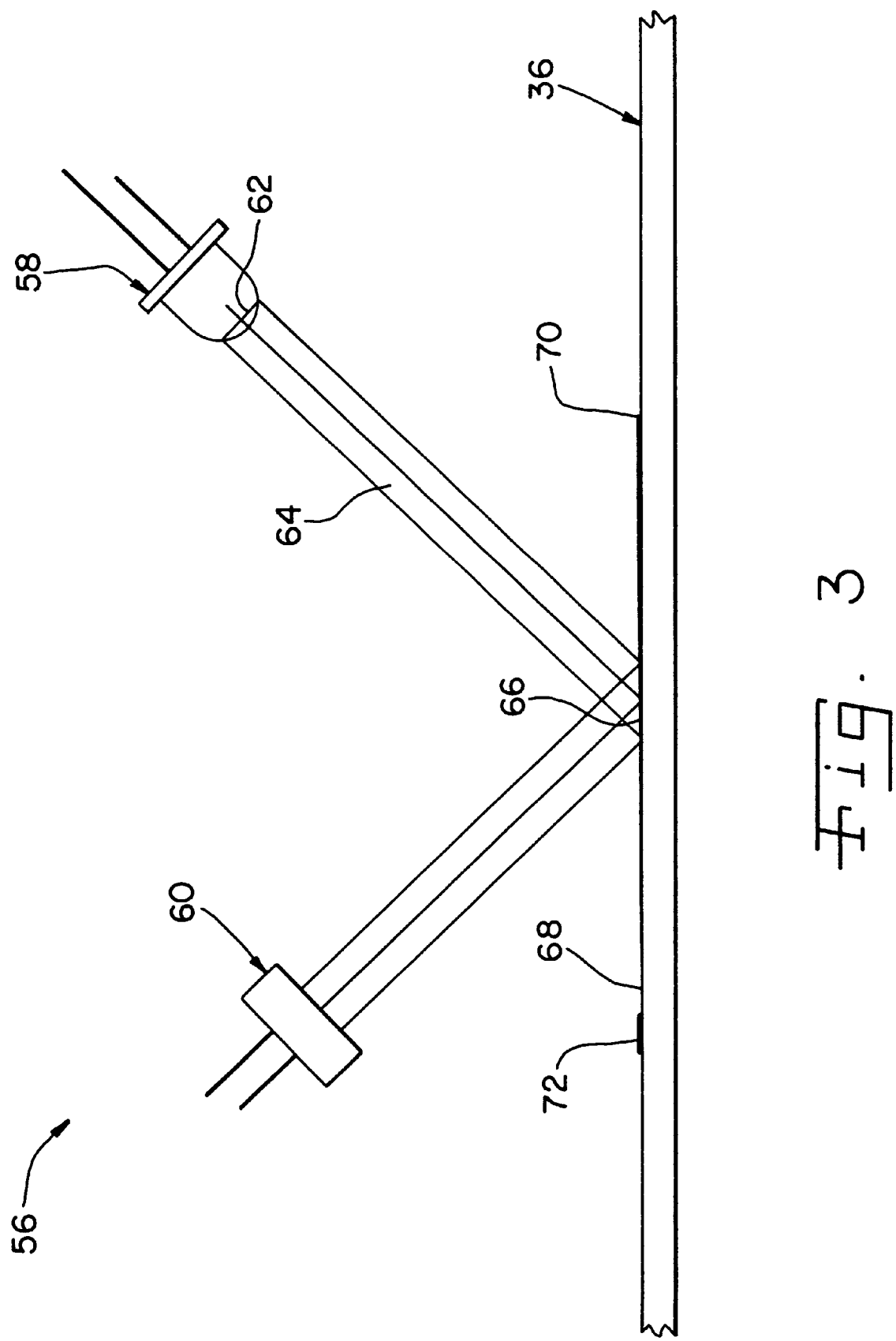
FIG. 3 is a side, schematic side view of the sensor arrangement of FIG. 2.

A sensor arrangement 56 includes a light source 58 and a light detector 60. Since belts are prone to warp and flutter as they move between rollers, patch sensor arrangement 56 can be located opposite a roller to stabilize the distance between sensor arrangement 56 and belt 36. An aperture 62 (FIG. 3) defines a light beam 64 produced by light source 58. Light beam 64 illuminates a continuous gradient toner test patch 66 on intermediate belt 36, bearing in mind "continuous gradient" may be substantially continuous as having been synthesized from discrete shade levels that can be produced by the printer. Typically, the gradient is synthesized from uncorrected shade levels 0–255. The light reflecting off of toner patch 66 is sensed by light detector 60.

Figure 4:
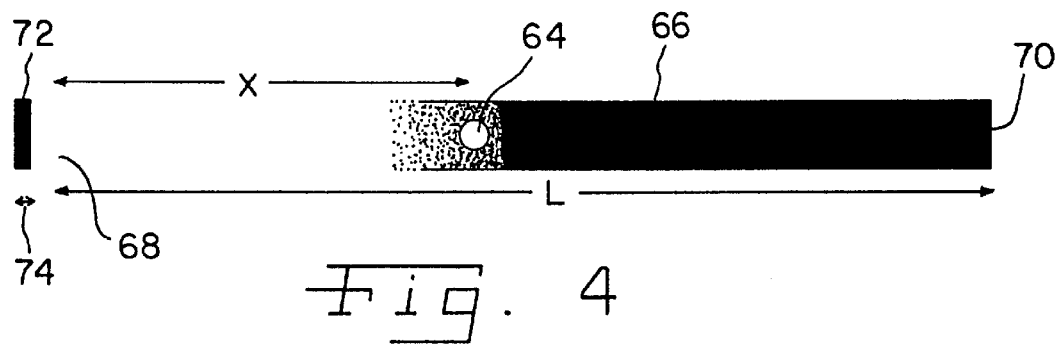
FIG. 4 is a top view of one embodiment of a continuous gradient toner patch which is illuminated by the light source of FIG. 3.

Continuous gradient patch 66 extends over an area on belt 36 that corresponds to the area occupied by conventional toner patches in prior art printers. That is, an eight-inch long continuous gradient patch 66 occupies the space that could otherwise be taken by eight one-inch conventional patches. Continuous gradient patch 66 has a white first end 68, best seen in FIG. 4, which has no toner coverage, and a solid second end 70 which has 100% toner coverage. The amount of toner coverage gradually increases along the length of gradient patch 66 from white end 68 to solid end 70.

A small solid bar 72 is at a fixed position just beyond and adjacent to white end 68. Bar 72 can be a distance away from white end 68 that is one-half the diameter of aperture 62 (one-half the diameter of light beam 64). Bar 72 marks the start of continuous gradient patch 66. Bar 72 has a width 74 that is approximately equal to the diameter of aperture 62 (the diameter of light beam 64) in order to provide a true solid area reading.

For a nominally linear gradient patch, the nominal coverage is given by X/L, where X is a distance between white end 68 and the middle of light beam 64 where it impinges upon continuous gradient patch 66, and L is the length of continuous gradient patch 66. For example, a light beam 64 with a diameter of 4 mm covers 2% of a 200 mm long gradient patch 66. The reading from sensor 56 will give the average color over the area illuminated by light beam 64, and given that the halftone response is substantially linear within this 2% region, the reading will represent the color of the halftone screen at X/200 nominal coverage. Assuming that sensor 56 can be read every 0.33 mm, almost 600 readings are obtained over the length of gradient patch 66.

In order to set the halftone linearization, each reflection signal is converted into a predicted L* or lightness. The predicted L* value is the lightness value one would expect to measure if the toner patch were transferred to paper and fused. The predicted L* values obtained in this manner are then fit to a piecewise polynomial function using a least squares method. The almost 600 readings are enough so that the least squares fit of the data covers the entire halftone response function, and is enough so that a significant amount of noise will be averaged out. The piecewise polynomial function is then used project L* values beyond and in between the tested conditions and allows more accurate image density control for the toner on intermediate transfer belt 36. The piecewise polynomial halftone response function is used to determine what percentage of toner coverage is necessary to achieve a desired lightness or L* level.

The change in toner coverage along the length of gradient patch 66 is not limited to being linear or monotonic, but the printer's software and controller 76 must track the position of light beam 64 with the nominal coverage. It is possible for light beam 64 to start at 100% toner coverage on gradient patch 66, drop to 0, then increase again to 100%. This gives two complete ramps, bounded by solid coverage so that the precise positions of both ends of gradient patch 66 are easily detected. Specific regions of interest may be repeated to reduce noise. For example, toner coverage on a gradient patch might start at 100%, drop to 0, increase to 25%, decrease to 0, then increase again to 100%.

There are two important issues with nonlinear or non-monotonic gradients. First, the rate of change of the nominal coverage is limited by the width of light beam 64 and the linearity of the halftone response. If the halftone response within the area illuminated by light beam 64 is nonlinear, then the average toner coverage within light beam 64 will not represent the toner coverage at the center of light beam 64. Second, if the direction of increasing toner coverage changes within the area illuminated by light beam 64, then the average toner coverage within light beam 64 will not represent the toner coverage at the center of light beam 64.

Figure 5A:
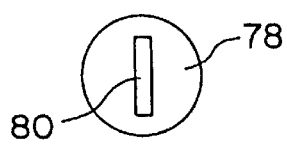
FIG. 5a is another embodiment of a light source assembly can be used in conjunction with the method of the present invention.
Figure 6A:
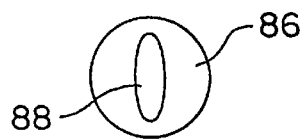
FIG. 6a is yet another embodiment of a light source assembly which can be used in conjunction with the method of the present invention.
Figure 5B:
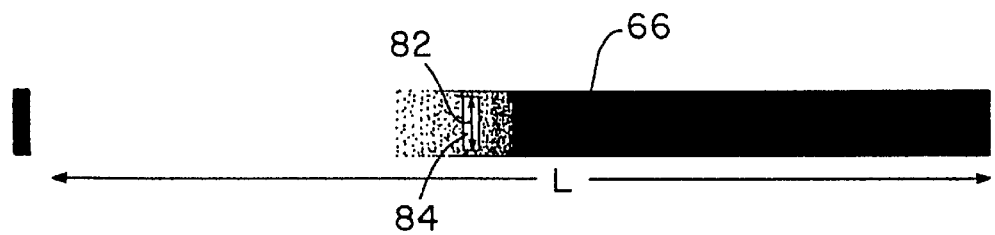
Figure 6B:
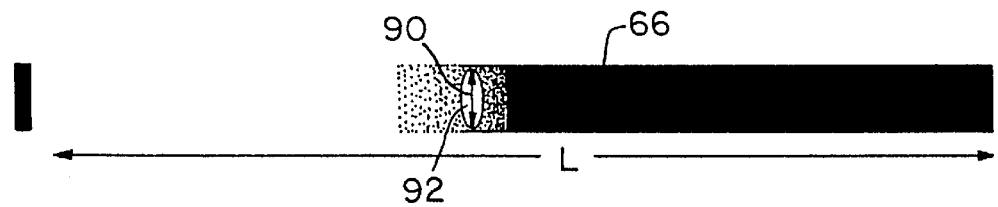

An easy solution to the above two issues is to keep the rate of change in toner coverage along the length of gradient patch 66 low enough so that the difference between the average coverage and the coverage at the center of light beam 64 is under the noise level, i.e., is negligible. One way of doing this while minimizing the length of gradient patch 66 is by modifying the shape of aperture 62 and light beam 64. For instance, a light source assembly including a light source 78 (FIG. 5a) having a rectangular aperture 80 can be used to illuminate the sample. The light source assembly is oriented such that a major axis 82 (FIG. 5b) of a rectangular area 84 illuminated through aperture 80 is perpendicular to the length of gradient patch 66. In another embodiment, a light source assembly including a light source 86 (FIG. 6a) having an elliptical aperture 88 can be used to illuminate the sample. The light source assembly is oriented such that a major axis 90 (FIG. 6b) of an elliptical area 92 illuminated through aperture 88 is perpendicular to the length of gradient patch 66. In either the embodiment of FIG. 5 or the embodiment of FIG. 6, a smaller portion of gradient patch 66 in the length direction is sampled than with the round light beam 64 of FIG. 4.

Another possible solution to the above two issues is that the software can average the nominal coverage within the light beam at any given position, based on the shape of the aperture and the nominal coverage at that point in gradient patch 66, and use that as a reference for the measured coverage.

Gradient patch 66 is used in the embodiment described herein to set the halftone linearization. However, it is to be understood that gradient patch 66 can also be used to set other imaging conditions, i.e., electrophotographic conditions such as laser power (exposure energy), developer roll bias voltage and/or gamma correction.

Figure 7:
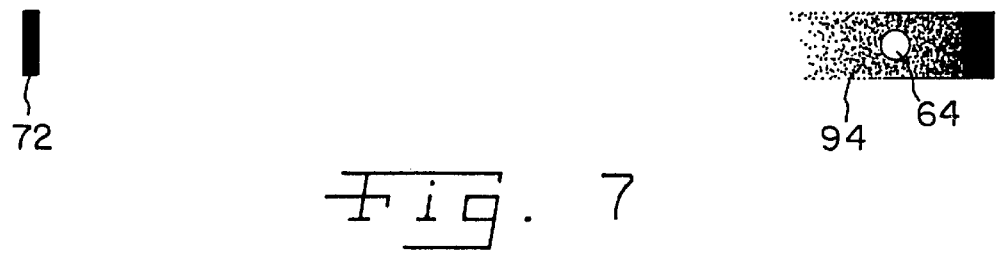
FIG. 7 is a top view of another embodiment of a continuous gradient toner patch which is illuminated by the light source of FIG. 3.

Gradient patch 66 has been described herein as having a linear increase in shade level between white end 68 and solid end 70. However, the change in shade level can also be nonlinear between white end 68 and solid end 70. For example, since L* is relatively insensitive to shade level at higher shade levels, the rate of increase in shade level can be greater on the darker side of the gradient patch, as is the case in gradient patch 94 (FIG. 7). Different shade levels are obtained by turning on different numbers of pixels within a halftone cell. In a laser printer this is done by exposing the photoconductive drum at the selected pixel locations.

The present invention has been described herein as being used in conjunction with an electrophotographic machine. However, it is to be understood that the method of the present invention can also be used in any printing device that uses a sensor to monitor and correct/linearize the halftone printing response. Such printing devices include inkjet printers, dye sublimation printers and thermal transfer printers.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of calibrating an electrophotographic machine having an image-bearing surface, said method comprising the steps of:
    depositing a toner patch on the image-bearing surface, said toner patch having a plurality of areas, said plurality of areas having different shade levels;
    emitting a light beam that extends over a region of multiple areas of said plurality of areas of said toner patch;
    measuring an amount of light that is reflected off of said multiple areas of said toner patch;
    repeating said emitting and measuring steps for each of a plurality of different regions of said toner patch; and
    adjusting at least one electrophotographic condition, said adjusting being dependent upon said measuring steps.

2. The method of claim 1, wherein said at least one electrophotographic condition comprises a halftone linerarization.

3. The method of claim 1, wherein the image-bearing surface comprises an intermediate transfer medium.

4. The method of claim 3, wherein the intermediate transfer medium comprises one of an intermediate transfer belt and a photoconductive drum.

5. The method of claim 1, wherein said plurality of different areas comprises more than twelve different areas.

6. The method of claim 5, wherein said plurality of different areas comprises more than 100 different areas.

7. The method of claim 1, wherein said toner patch comprises a continuous gradient toner patch.

8. The method of claim 7, wherein said continuous gradient toner patch has a toner coverage that changes in a first direction, said light beam having a major axis and a minor axis, the major axis being larger than the minor axis, the major axis being substantially perpendicular to the first direction.

9. The method of claim 8, wherein the light beam has a rectangular cross-sectional shape.

10. The method of claim 8, wherein the light beam has an elliptical cross-sectional shape.

11. The method of claim 7, wherein said continuous gradient toner patch has a length of more than two inches.

12. A method of calibrating an electrophotographic machine having an image-bearing surface, said method comprising the steps of:
    depositing a toner patch on the image-bearing surface, said toner patch having a plurality of areas, said areas having different amounts of toner coverage;
    emitting light onto a selected one of said areas of said toner patch;
    measuring an amount of light that is reflected off of said selected one area of said toner patch;
    repeating said emitting and measuring steps for each of a plurality of different said areas of said toner patch;
    adjusting at least one electrophotographic condition, said adjusting being dependent upon said measuring steps;
    converting each said measured amount of light into a respective L* value; and
    fitting said L* values into a halftone response function,
    wherein said at least one electrophotographic condition comprises a halftone linearization.

13. The method of claim 12, wherein said fitting step includes using a least squares method.

14. The method of claim 12, wherein said adjusting step is dependent upon said halftone response function.

15. A method of calibrating an electrophotographic machine having an image-bearing surface, said method comprising the steps of:
    depositing a toner patch on the image-bearing surface, said toner patch having a plurality of areas, said areas having different amounts of toner coverage;
    emitting light onto a selected one of said areas of said toner patch;
    measuring an amount of light that is reflected off of said selected one area of said toner patch;
    repeating said emitting and measuring steps for each of a plurality of different said areas of said toner patch; and
    adjusting at least one electrophotographic condition, said adjusting being dependent upon said measuring steps,
    wherein said toner patch comprises a continuous gradient toner patch.

16. The method of claim 15, wherein said continuous gradient toner patch has a first end and a second end, said first end having approximately 0% toner coverage, said second end having approximately 100% toner coverage.

17. The method of claim 16, wherein said continuous gradient toner patch has a toner coverage that increases substantially linearly between said first end and said second end.

18. The method of claim 16, comprising the further steps of:
    depositing a solid toner patch adjacent to said first end of said continuous gradient toner patch on the image-bearing surface; and
    using said solid toner patch to determine a location of said first end of said continuous gradient toner patch.

19. The method of claim 16, wherein said repeating step includes scanning the light from said second end to said first end and back to said second end.

20. The method of claim 16, wherein said repeating step includes:
scanning the light from said second end to said first end;
scanning the light from said first end to a selected said area of said toner patch having a toner coverage of less than 50% and back to said first end; and
scanning the light from said first end back to said second end.

21. The method of claim 16, wherein said continuous gradient toner patch has a toner coverage that increases nonlinearly between said first end and said second end.

22. The method of claim 15, wherein said continuous gradient toner patch has a toner coverage that changes in a first direction, said emitting step comprising emitting a light beam onto said selected one of said areas of said continuous gradient toner patch, the light beam having a major axis and a minor axis, the major axis being larger than the minor axis, the major axis being substantially perpendicular to the first direction.

23. The method of claim 22, wherein the light beam has a rectangular cross-sectional shape.

24. The method of claim 22, wherein the light beam has an elliptical cross-sectional shape.

25. The method of claim 15, wherein said continuous gradient toner patch has a length of more than two inches.

26. A method of calibrating an imaging apparatus, said imaging apparatus being capable of producing images, said method comprising the steps of:
producing a test patch on an image-bearing surface, said test patch having a plurality of areas, said plurality of areas having different shade levels;
emitting light onto a region including multiple areas of said plurality of areas of said test patch;
measuring an amount of light that is reflected off of said region of said test patch;
repeating said emitting and measuring steps for each of a plurality of different regions of said test patch; and
adjusting at least one imaging condition, said adjusting being dependent upon said measuring steps.

* * * * *